(12) United States Patent
Novak et al.

(10) Patent No.: US 9,602,583 B2
(45) Date of Patent: Mar. 21, 2017

(54) SUPPLY ITEM MESSAGING (75) Inventors: David B. Novak, Philomath, OR (US);
Brian Woods, Leixlip (IE); Erik D. Ness, Vancouver, WA (US); Huston W. Rice, Vancouver, WA (US); Amy Shipman, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 174 days.

(21) Appl. No.: 14/114,404

(22) PCT Filed: Apr. 28, 2011

(86) PCT No.: PCT/US2011/034332
§ 371 (c)(1),
(2), (4) Date: Oct. 28, 2013

(87) PCT Pub. No.: WO2012/148400
PCT Pub. Date: Nov. 1, 2012

(65) Prior Publication Data
US 2014/0059138 A1 Feb. 27, 2014

(51) Int. Cl.
*H04L 29/08* (2006.01)
*G06F 9/445* (2006.01)
(52) U.S. Cl.
CPC ............... *H04L 67/10* (2013.01); *G06F 8/65* (2013.01)
(58) Field of Classification Search
CPC ..................................................... H04L 67/10
USPC ......................................................... 709/204
See application file for complete search history.

(56) References Cited

U.S. PATENT DOCUMENTS

| 6,772,374 | B2 | 8/2004 | Forman et al. |
| 7,027,808 | B2 | 4/2006 | Wesby |
| 7,099,028 | B2 | 8/2006 | Schneider et al. |
| 7,480,592 | B2 | 1/2009 | Hori |
| 7,634,798 | B2 | 12/2009 | Watson |
| 7,886,026 | B2 | 2/2011 | Haines et al. |
| 2002/0118243 | A1* | 8/2002 | Forman ............... B41J 2/17546 347/19 |
| 2002/0140966 | A1 | 10/2002 | Meade, II et al. |
| 2002/0171860 | A1 | 11/2002 | Parry et al. |
| 2003/0011633 | A1 | 1/2003 | Conley et al. |
| 2004/0080774 | A1 | 4/2004 | Owen et al. |

(Continued)

FOREIGN PATENT DOCUMENTS

| CN | 1432926 A | 7/2003 |
| CN | 1533517 A | 9/2004 |

(Continued)

OTHER PUBLICATIONS

Supplementary European Search Report for Application No. EP 11864401.2, Report issued Aug. 20, 2014.

*Primary Examiner* — Suraj Joshi
(74) *Attorney, Agent, or Firm* — Tarolli, Sundheim, Covell & Tummino L.L.P.

(57) ABSTRACT

One example discloses a peripheral supply component. The peripheral supply component includes a supply item (130) to provide resources on an installed peripheral component (110), wherein the supply item (130) is a consumable, upgradable, or replacement component on the installed peripheral component (110). An encoded component (140) is installed with the supply item (130), wherein the encoded component (140) is employed to generate a message event related to the peripheral component.

20 Claims, 7 Drawing Sheets

(56) References Cited

U.S. PATENT DOCUMENTS

| | | |
|---|---|---|
| 2006/0031768 A1 | 2/2006 | Shah et al. |
| 2008/0178170 A1 | 7/2008 | Abe et al. |
| 2008/0270252 A1* | 10/2008 | Davis .................... G06Q 30/02 705/26.41 |
| 2011/0075189 A1 | 3/2011 | Refstrup |

FOREIGN PATENT DOCUMENTS

| | | |
|---|---|---|
| CN | 101072280 | 11/2007 |
| EP | 0 878 305 B1 | 7/2001 |
| WO | 2009-145774 A1 | 12/2009 |

* cited by examiner

SUPPLY ITEM MESSAGING

BACKGROUND

Computer peripherals come in many forms including printers, copiers, fax machines, scanners, entertainment devices, and so forth. Not only are these devices or peripherals connected locally to various computing devices but they are more than likely connected to a network environment in conjunction with the respective computing devices, wherein the network is sometimes referred to as a "cloud." The term "cloud" is used as a metaphor for the Internet, based on the cloud drawing often used to represent computer networks. Cloud computing describes a supplement, consumption, and delivery model for information technologies services based on the Internet, and can involve over-the-Internet provision of dynamically scalable and often virtualized resources.

DETAILED DESCRIPTION

Figure 1:
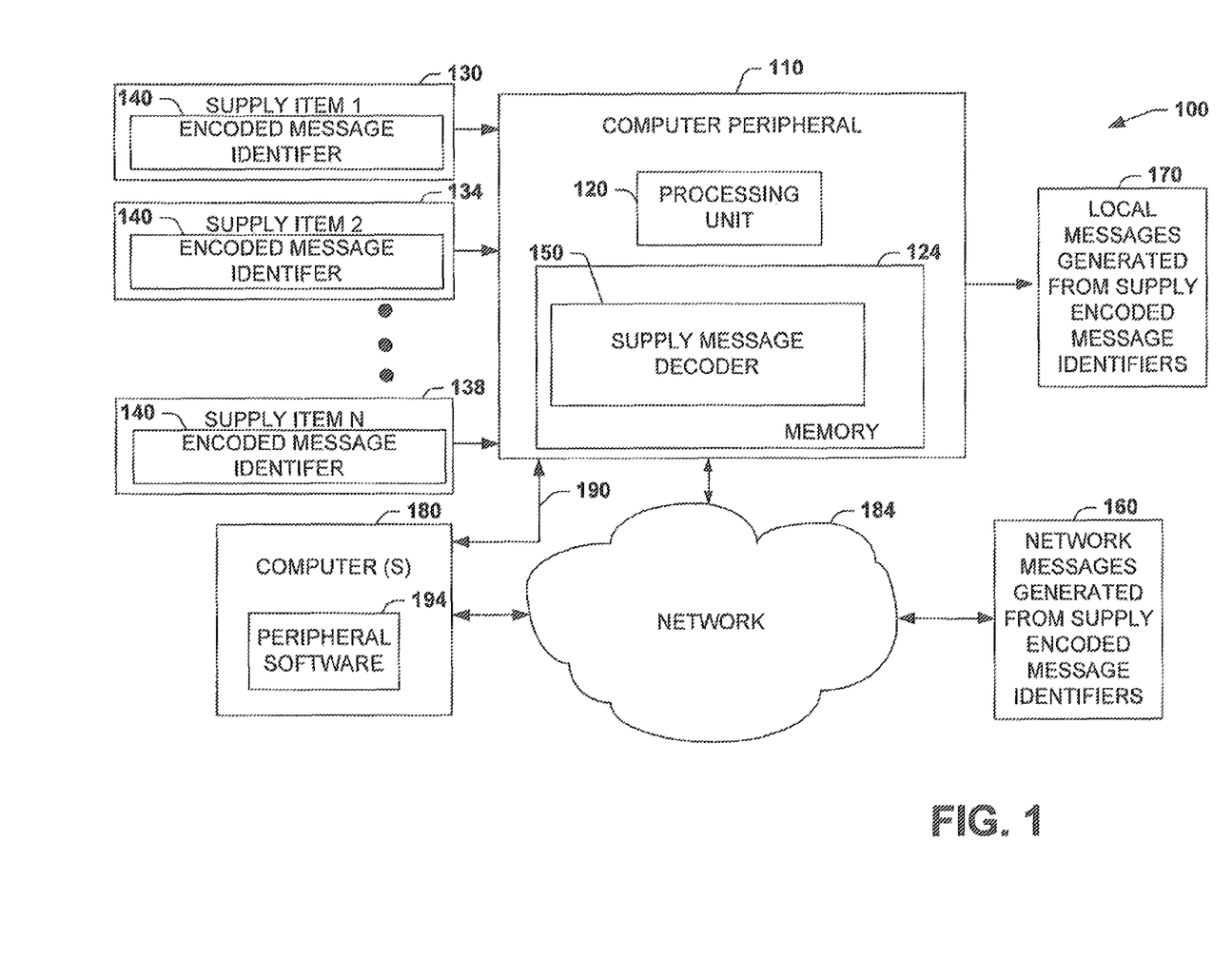
FIG. 1 illustrates an example of a system for generating supply enabled messages.

FIG. 1 illustrates an example system 100 for generating supply enabled messages. The system 100 includes a computer peripheral 110 (or peripheral device) that includes a processing unit 120 (or processor) that executes instructions from a memory 124 that includes firmware or other storage media. One or more supply items 130-138 are provided to the computer peripheral 110 as resources for the peripheral, where the supply items are labeled 1-N, with N being an integer greater than or equal to 1. Such supply items 130-138 could include replacement items (e.g., ink or toner), upgrade items (e.g., component to add functionality to peripheral), or repair items (e.g., replacement for worn or defective components) for example which are described in more detail below. As shown, each of the respective supply items 130-138 can include an encoded message identifier 140 that can be processed by a supply message decoder 150 which in turn generates or triggers message events to provide further communications at a network site 160 (e.g., website) and/or at a local display associated with the peripheral 110. The peripheral 110 can communicate with a computer or computing device 180 via a network connection 184 and/or via a local connection 190, wherein the computing device can include software 194 to interact with the peripheral. For instance, in one example, the message event can include forwarding, by the supply message decoder 150, the encoded message identifier 140 to the network site 160. The network site 160 can employ the encoded message identifier 140 to identify a particular message for the computer peripheral 110 and/or the computing device 180.

It is noted that the encoded message identifier 140 can be determined and generated external to the computer peripheral 110. For instance, in conventional peripheral systems, an ink-low message may be generated by the computer peripheral 110 or computer 180 which is determined and detected by the peripheral. In contrast, the encoded message identifier 140 can be generated external to the peripheral 110 and employed to provide information that may not and/or cannot be determined by the peripheral itself and thus provides many benefits and utilities which are described in more detail below. In one example, a peripheral subsystem is provided. This includes a replaceable or upgradable supply item 130-138 to provide a resource to a peripheral device 110. An encoded message identifier 140 can be installed with the supply item 130-138, wherein the encoded message identifier can be employed to generate a message event related to the peripheral device.

The encoded message identifier 140 can include a reference to a system or message. The reference could be implemented, for example as number and/or a bit code to specify a system or a message number to trigger a message to be displayed. In another example, the encoded message identifier 140 includes supply data that triggers the message events, wherein the message events are employed to communicate a message from a peripheral manufacturer, to determine a model number of a targeted peripheral, or determine that a message is to be broadcast to members of a designated peripheral class. In yet another example, the encoded message identifier 140 includes a data value that triggers classes of messages.

Classes of messages can be related to differing aspects such as a class code to indicate no messages are available. Other classes relate to warranty issues, recall issues, repairs, limited supplies availability, or new supply model numbers, for example. Message events generated from the encoded message identifiers 140 can trigger communications at a network website 160, wherein the communications (bi-directional) can include text, images, audio, graphics, and/or video, for example. The respective message events can also trigger communications at the local display 170 associated with the peripheral 110, wherein the communications can also include text, images, audio, graphics, video, and so forth.

As can be appreciated, the supply items 130-138 can include various items associated with the peripheral 110 that includes ink, toner, a replacement component, a repair component, or a device upgrade component, for example. The supply item 130-138 can be employed with a printer, a copier, a fax machine, a scanner, a peripheral device, or an entertainment device, for example. In another example aspect, a peripheral system 100 is provided. This includes the memory 124 for storing computer executable instructions associated with a peripheral device 110. A processing unit 110 can also be provided for accessing the memory 124 and executing the computer executable instructions. Such instructions can include the supply message decoder 150 to detect an encoded bit stream from a peripheral replacement item or peripheral upgrade item 130-138, wherein the encoded bit streams are employed to generate messages that are determined external to the peripheral device 110 as noted previously. The encoded bit streams can be employed to generate classes of messages, wherein the classes of messages can be related to no message, warranty recall, customer repair, limited supply availability, or new selectable number, for example.

It is noted that the encoded message identifiers 140 can be in the form of electronic data such as bit streams but mechanical encodings are also possible. For example, if a replacement part were added to the system, an indenture or other mechanical feature such as a raised point could be used to trigger an event at the peripheral 110. For instance, two mechanical indents followed by a raised feature (e.g., mechanical code representing 001) on a replacement part could be mechanically detected and employed to trigger further electronic communications at the network site 160 and/or locally at 170. The following discussion is related to a specific example of the system 100. Notably the discussion is related to the computer peripheral 110 being employed as a printing device but as noted previously, it is to be appreciated that the computer peripheral is not limited to such example.

After peripheral devices 110 such as printers have been released or sold, manufacturers can become aware of issues and solutions to those issues yet have limited means to effectively communicate to those who may be affected. One problem considers how communications should commence in the future with users—especially those who have not otherwise registered the peripherals. For example, by encoding data on the supply items 130-138, printer firmware and software can communicate to the user that the manufacturer has identified an issue with their respective printer or other device. The user can then be directed to a web site via a link in the message, for example. The web site, using data sent from the printer, can provide details (e.g., text, video, and so forth) to repair printer issues. Issues could include recalls (e.g., power cords, power supplies, and so forth), customer fixes (e.g., how to repair pick rollers), supply availability (e.g., where to go to find older supplies), and Selectability Number changes, where alternative supply information may be provided that provides a different replacement model number, for example. It is noted that the term selectability number can include other types of numbers such as part numbers, for example.

For warranty recalls, prior solutions allowed contacting customers who registered their printer's via mail or e-mail, for example. Recall notices were also provided on the web but many users do not consult such resources. Customer repairs can be handled by an agent but automated methods for communicating such repairs were lacking. For limited supplies availability, there were no suitable methods to identify or inform customers about where to find supplies when fewer stores were offering such items. Thus, there is no suitable method of proactively and automatically communicating to respective users who may not have otherwise been previously identified. For selectability number (or part number) changes, sellers may attempt to communicate these changes at point of sale, but this can be confusing to customers.

By placing encoded data on a supply item 130-138, the manufacturer can broadcast a message to printers that accept the supply or a single printer model within a platform. This supply data can also include a reference number to specify to the system which type of message and which specific message should be displayed. Supply item data can include bit triggered message identifiers that can be encoded as an integer in the supply item's bit map, for example. The encoded value can cause firmware and software to provide a tailored message for the type of issue the manufacturer is attempting to communicate to the user. Encoded supply data can also enable the printer or other device to determine the specific model number of the targeted printer or recognize that the message is a broadcast message for the printers that can accept the supply.

In one example, the integer encoded in the supply item 130-138 can generate classes of messages. These classes can include for example: "No Message", "Warranty Recall", "Customer Repairs", "Limited Supplies Availability", and "New Selectability Numbers" among other class designations. Thus, printer firmware/software could display a general message for each of these classes of messages (e.g. Warranty Recall message could be "There is a Warranty Recall on your printer. Please go to specified location for more information"). These messages are usually general in nature because at the time the printer is shipped, the manufacturer is generally unaware of potential problems/issues and they should have a flexible system to process the unknown.

When the user clicks on the web link triggered from the encoded message identifiers, the printer can then pass/communicate information to the web site. This information can contain data such as Printer Model Number, Printer Build Date, Firmware Revision, Supply Bit Triggered Message Integer, Supply detail (e.g., color, size, and so forth), country, language, and so forth. The web site uses the information provided by the printer or other device/peripheral to determine the specific message for that printer. These messages could be anything from text, text/graphics to video, for example. Together, the Supply, Printer, and Web site provide unique and tailored messaging to customers. Using the supply to 'push' this type of messaging is an improvement over current methods since all printers use supplies and thus manufacturers can improve the effectiveness of making users aware of issues/changes as they arise.

In some examples, each of the supply items 130-138 can have a unique encoded message identifier 140. For instance, in an example wherein the computer peripheral 110 is implemented as a color printer that can receive four different ink cartridges (e.g., black, magenta, cyan and yellow cartridges), each of the supply items 130-138 could be implemented as an ink cartridge of a specific color. In such a situation, a black ink cartridge could be implemented with a first encoded message identifier 140, while a color cartridge (e.g., magenta, cyan or yellow) could be implemented with a second encoded message identifier 140, different from the first encoded message identifier 140. In such a situation, different network messages 160 could be generated for the computer peripheral 110 depending on the particular supply item 130-138 installed at the computer peripheral 110.

Some advantages of using the web to 'host' the actual messages include: 1. The manufacturer does not know in advance what problems/issues they need to solve. Placing the actual message with the supply item allows flexibility to address issues as they are discovered versus having to try to anticipate problems/solutions if they had placed the specific messages in software or Front Panel upon initial shipment; 2. Messages/Solutions can be updated on web more easily than in software/firmware. The web is often better suited to enabling multi-media messages (e.g. videos of how to repair a printer issues verses just text or text/graphics); 3. The manufacturer does not know in advance what Selectability Numbers (like model numbers) will change to in the future. Having the information on the web allows flexibility to make unanticipated changes at some point in the future.

As noted previously, the network system 100 can be implemented, for example, as a computing cloud, where the peripheral 110 can be connected to the network 184. The network 184 can be implemented, for example, as the Internet. Nodes on the network 184 can communicate via a communications protocol, such as Transmission Control Protocol/Internet Protocol (TCP/IP), Internet Protocol version 6 (IPv6), and so forth. The peripheral 110 can be implemented as a cloud device, for example, wherein the peripheral can be assigned a node address (e.g., an IP address) on the network 184, where the peripheral can also be registered.

For purposes of simplification of explanation, in the present example, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, as software (e.g., computer executable instructions), hardware (e.g., an application specific integrated circuit), or as a combination of both (e.g., firmware). In other examples, the components could be distributing among remote devices across the network 184 (e.g., external web services).

Figure 2:
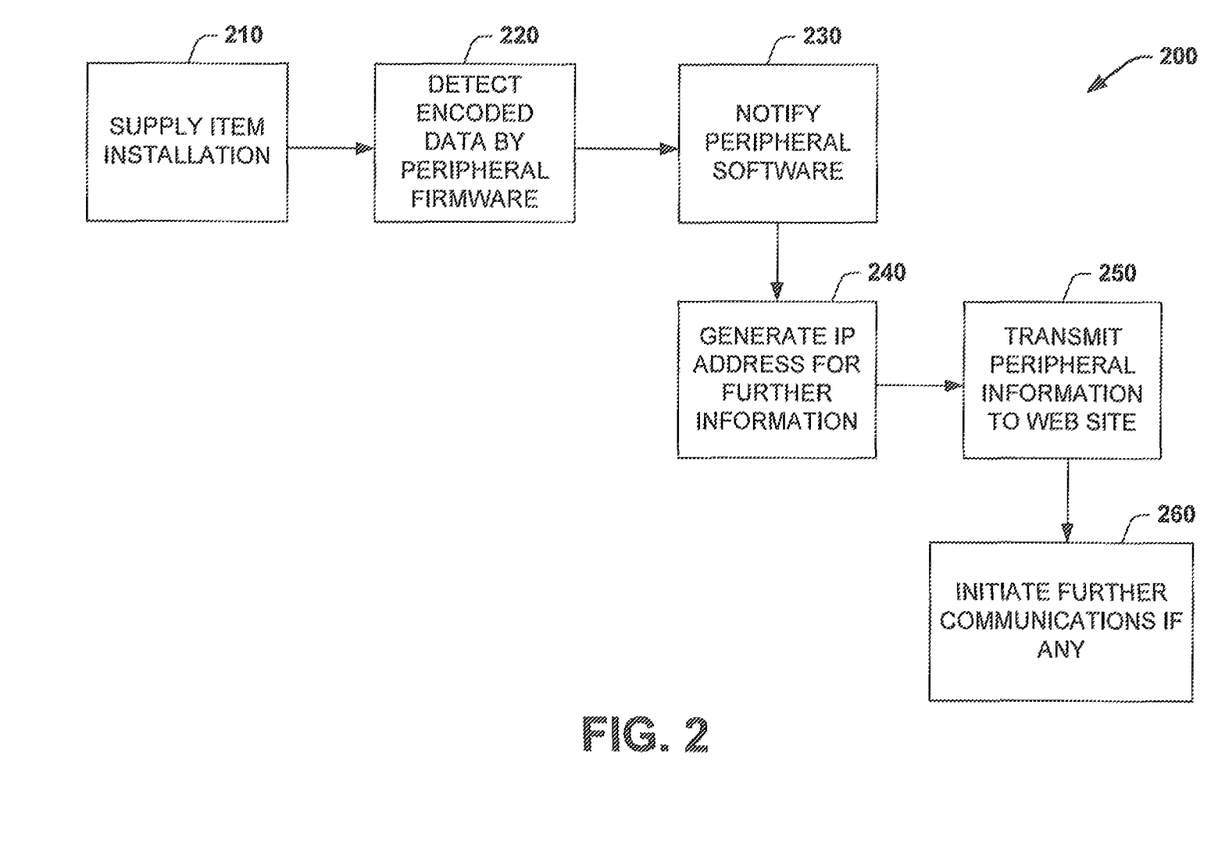
FIG. 2 illustrates an example of communications triggered from supply enabled events.

FIG. 2 illustrates an example of communications triggered from supply enabled events. At 210, a supply item installation occurs. This could include installing a new ink cartridge in a printer example or a new toner in a copier example. As noted previously, substantially any type of peripheral can be employed. At 220, encoded data on the installed supply item is detected by peripheral firmware (or software). At 230, peripheral software is notified of a potential encoded message identifier that has been detected at 230. Peripheral software is typically loaded at a computer that operates the peripheral but the software can also execute at the peripheral. At 240, an Internet Protocol (IP) address is generated that allows a user to select such address to enable further communications regarding the peripheral where the supply item is installed. Such messages could also be general in nature (not necessarily related to peripheral where supply item was installed) such as an announcement by a manufacturer that some promotion or other feature is available. At 250, when the web site communications have been established, peripheral information can be sent by the peripheral automatically to the web site in order to tailor communications to the situation detected. It is noted that the peripheral information can include information outside of supply information such as Model Number, Serial Number, error states, status states, and so forth for example. At 260, further communications are commenced with the user if necessary. As noted previously, such communications can be in substantially any form such as text, graphics, audio, video, and so forth. This could include downloading upgrade data to the peripheral such as enhanced software or firmware upgrades for the peripheral.

Figure 3:
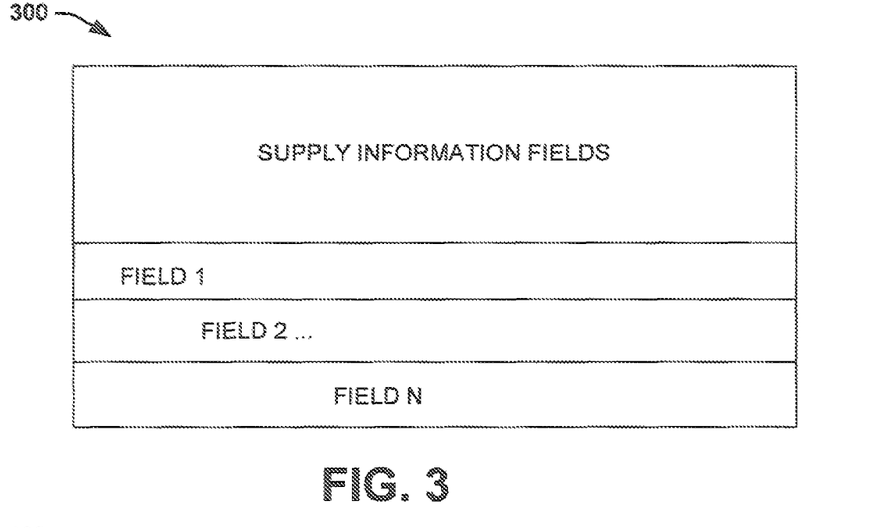
FIG. 3 illustrates an example of generalized supply information fields for supply enabled messages.

FIG. 3 illustrates an example of generalized supply information fields 300 for supply enabled messages. As shown, the supply information fields can include a field of encoded or non-encoded information. For example, one field might specify a code that triggers a warranty message at a web site. In another example, the message itself may be contained in the field or respective fields 300.

Figure 4:
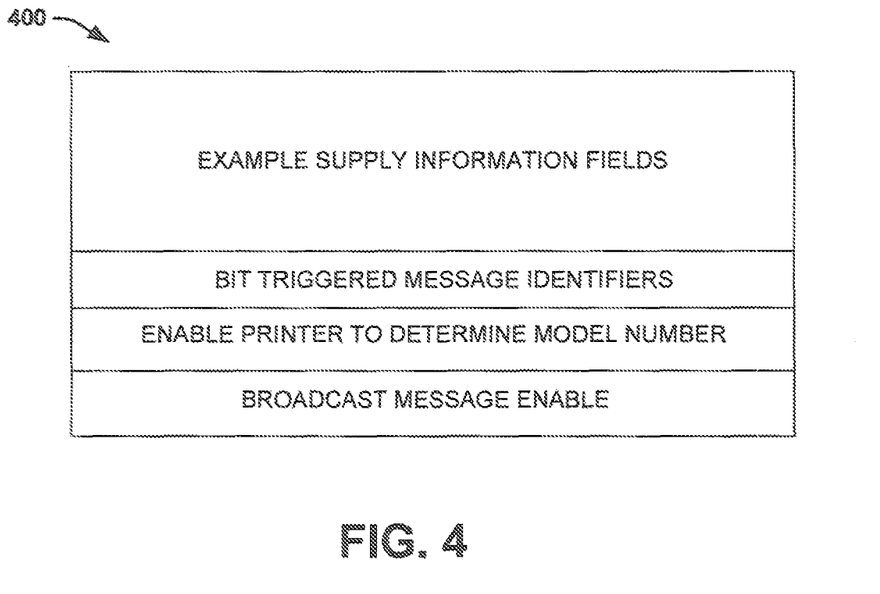
FIG. 4 illustrates an example of supply information fields for supply enabled messages.

FIG. 4 illustrates an example of supply information fields 400 for supply enabled messages. As shown in the examples at 400, the supply information fields could include bit triggered message identifiers. For example, code 1 might be related to warranty information and code 2 might be related to repair information, wherein a plurality of various codes and messages could be created as can be appreciated. Another supply information field 400 might include a code to enable a printer or other peripheral to determine and/or communicate its respective model number. Still yet another information field example might include a code that enables a broadcast message, for example.

Figure 5:
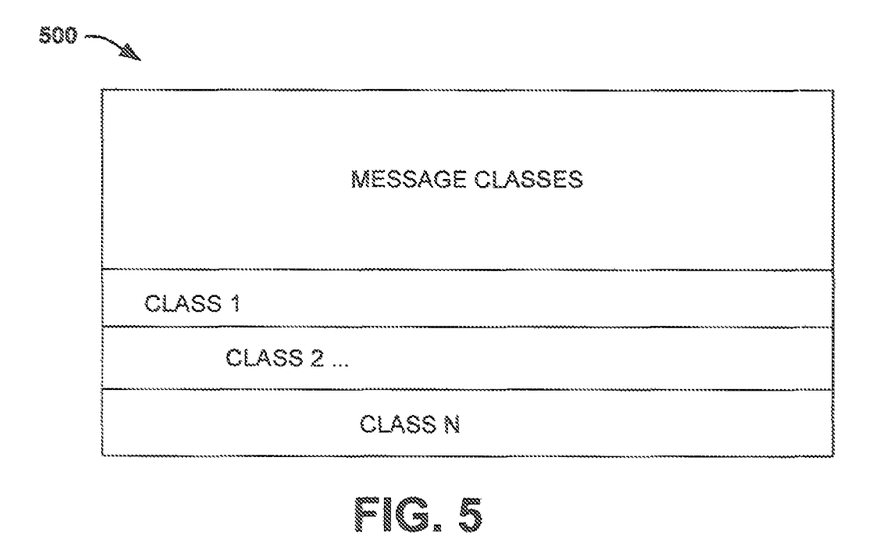
FIG. 5 illustrates an example of generalized message classes for supply enabled messages.

FIG. 5 illustrates an example of generalized message classes 500 or supply enabled messages. As shown, the messages classes can include a message related to differing types or categories of messages. Such classes 500 could include subclasses (e.g., class=warranty, subclass=rollers). Such classes 500 could also include nested classes (e.g., classes specifying other classes and so forth). As can be appreciated, various combinations of classes, subclasses, and nested classes are possible.

Figure 6:
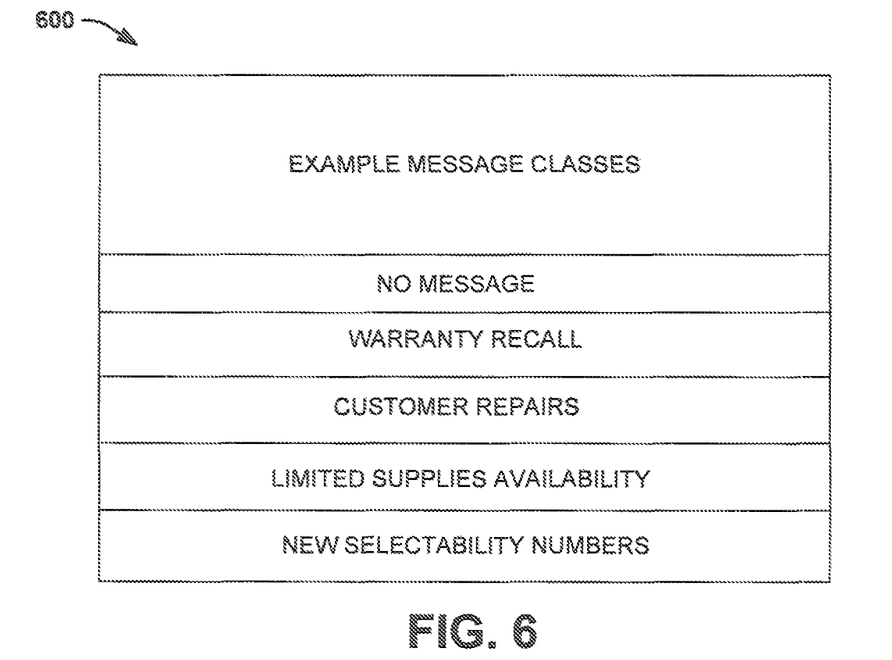
FIG. 6 illustrates an example of message classes for supply enabled messages.

FIG. 6 illustrates an example of message classes 600 for supply enabled messages. These classes 600 can include for example: "No Message", "Warranty Recall", "Customer Repairs", "Limited Supplies Availability", and "New Selectability Numbers" among other class designations. Thus, peripheral firmware/software could display a general message for each of these classes of messages. These messages are usually general in nature because at the time the peripheral is shipped, the manufacturer is generally unaware of potential problems/issues and they should have a flexible system to process the unknown.

Figure 7:
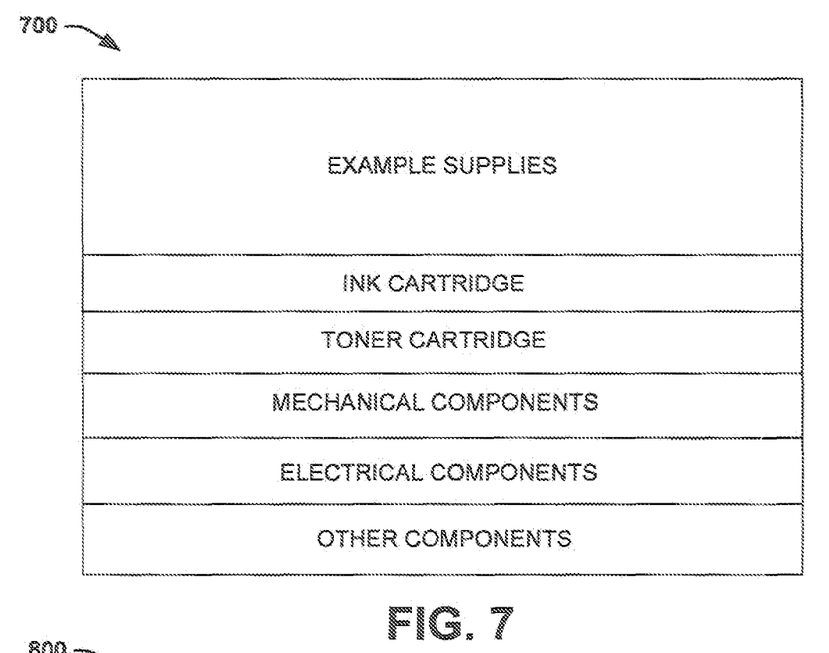
FIG. 7 illustrates an example of supplies for supply enabled messages.

FIG. 7 illustrates an example of supplies 700 for supply enabled messages. Such supplies 700 could include ink cartridges, toner cartridges, scanner supplies, fax machine supplies, mechanical components, electrical components, or other components. Substantially any item 700 that could be installed can have information (encoded or otherwise) supplied to the respective device where the installation occurs.

Figure 8:
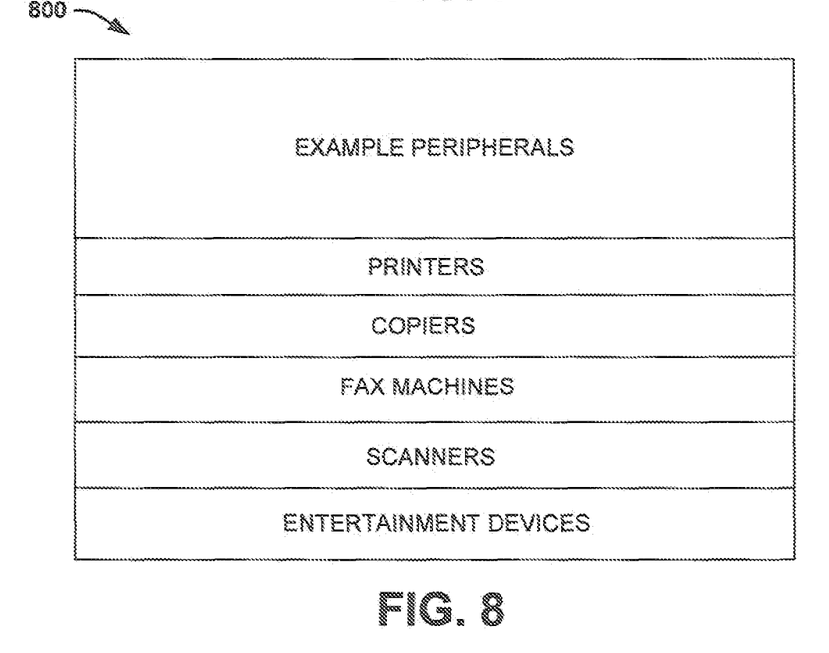
FIG. 8 illustrates an example of peripherals for supply enabled messages.

FIG. 8 illustrates an example of peripherals 800 for supply enabled messages. As shown, such peripherals or other devices 800 could include printers, copiers, fax machines, scanners, entertainment devices, and so forth for example. Substantially any device that can receive a replacement or upgrade component can be utilized to receive and further process supply enabled messages.

Figure 9:
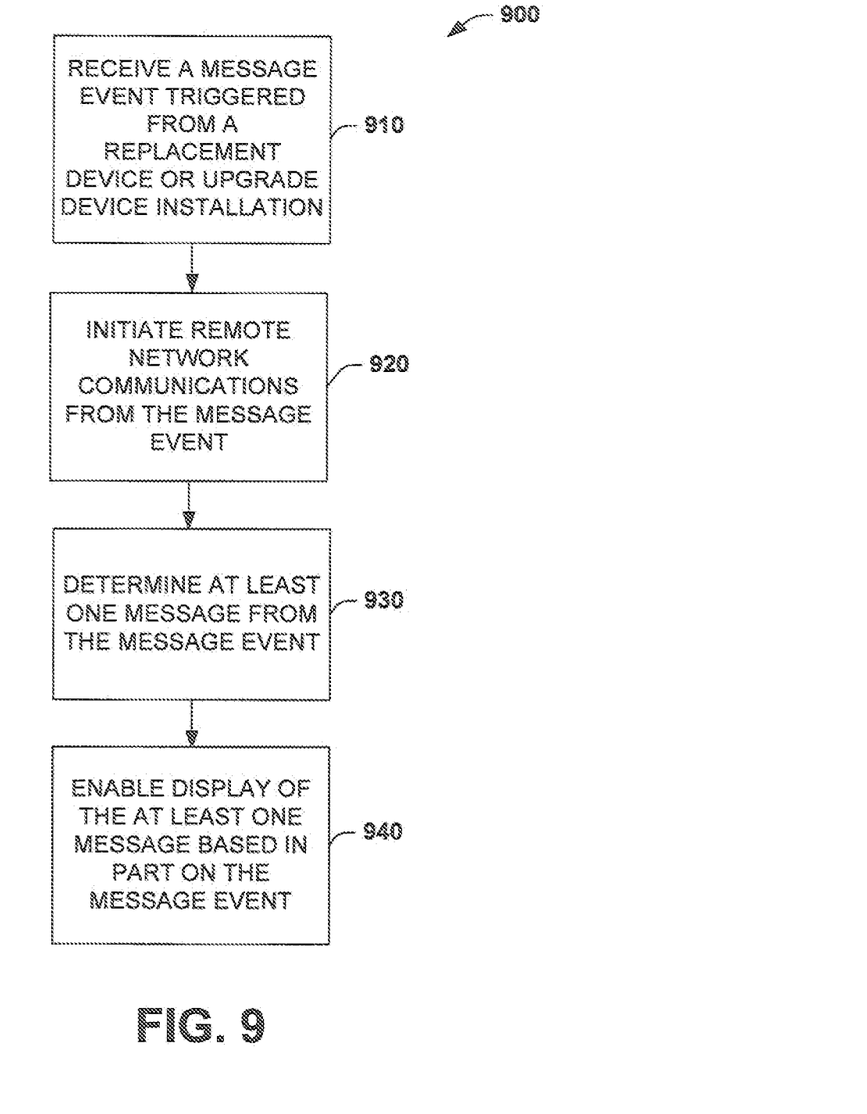
FIG. 9 illustrates a flowchart example of a method for generating supply enabled messages.

In view of the foregoing structural and functional features described above, an example method will be better appreciated with reference to FIG. 9. While, for purposes of simplicity of explanation, the example method of FIG. 9 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method.

FIG. 9 illustrates an example method 900 for generating supply enabled messages. The method 900 could be employed for peripheral communications, for example. At 910, the method includes receiving a message event triggered from a replacement device or upgrade device installation. The message event can comprise an encoded message identifier stored at the replacement or upgrade device. As noted previously, such replacement could include providing new supplies such as ink or toner after they are consumed. This could also include replacing defective or worn components and include adding components to the peripheral for upgrades for example. At 920, the method includes initiating remote network communications from the message event. At 930, the method includes determining at least one message from the message event based on the encoded message identifier. For instance, this could include interpreting encoded bit streams for example and utilizing the bit streams to trigger further communications. At 940, the method includes enabling display of the at least one message based in part on the message event. As noted previously, this could include generating a local display message at the peripheral and/or trigging remote network communications at a website, for example. It is also noted that the message so generated may be no message where the encoded bit stream instructs the peripheral that no messages are available. It is noted that the encoded information (or peripheral device information) can include peripheral information outside of supply information (e.g., Model Number, Serial Number, error states, status states, and so forth).

Other examples of the method 900 include enabling display of the at least one message at a network website or at a location local to a peripheral. This includes storing the event data on a supply item associated with a printer, a copier, a fax machine, a scanner, a peripheral device, or an entertainment device. The method 900 can also include generating the at least one message to communicate recall information, warranty information, repair information, supply availability information, or a product name change related to alternative supplies that are available. This can also include decoding message classes, wherein the message classes include no messages, warranty recall messages, customer repair messages, limited supply availability messages, or alternative number messages to facilitate purchase of replacement supplies. Another example includes enabling website communications, wherein a peripheral transmits information to the website. This can include processing the information at the website to determine messages for the peripheral, wherein the messages include text, graphics, images, audio, or video.

Figure 10:
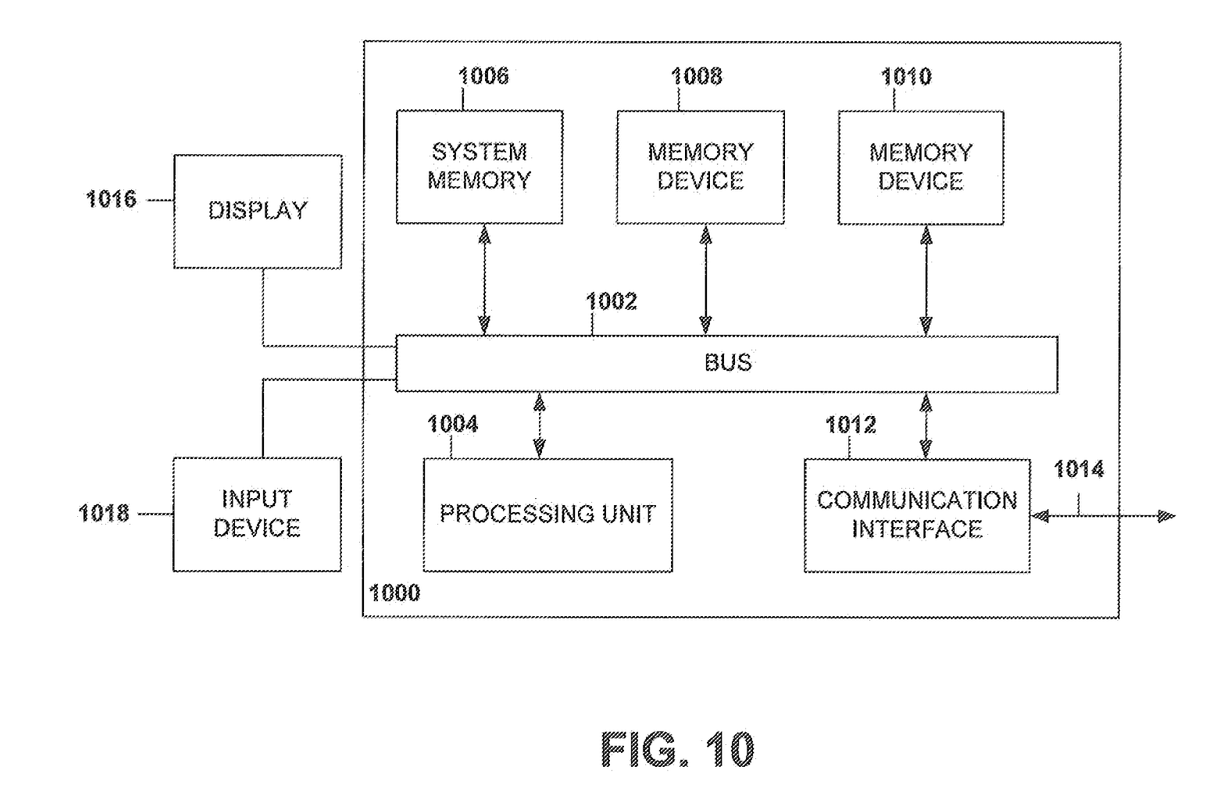
FIG. 10 illustrates an example of a computer system that can be employed to implement the systems and methods illustrated in FIGS. 1-9.

FIG. 10 is a schematic block diagram illustrating an example system 1000 of hardware components capable of implementing examples disclosed in FIGS. 1-9. The system 1000 can include various systems and subsystems. The system 1000 can be a personal computer, a laptop computer, a workstation, a computer system, an appliance, an application-specific integrated circuit (ASIC), a server, a server blade center, a server farm, a mobile device, such as a smart phone, a personal digital assistant, etc.

The system 1000 can include a system bus 1002, a processing unit 1004, a system memory 1006, memory devices 1008 and 1010, a communication interface 1012 (e.g., a network interface), a communication link 1014, a display 1016 (e.g., a video screen), and an input device 1018 (e.g., a keyboard and/or a mouse). The system bus 1002 can be in communication with the processing unit 1004 and the system memory 1006. The additional memory devices 1008 and 1010, such as a hard disk drive, server, stand alone database, or other non-volatile memory, can also be in communication with the system bus 1002. The system bus 1002 operably interconnects the processing unit 1004, the memory devices 1006-1010, the communication interface 1012, the display 1016, and the input device 1018. In some examples, the system bus 1002 also operably interconnects an additional port (not shown), such as a universal serial bus (USB) port.

The processing unit 1004 can be a computing device and can include an application-specific integrated circuit (ASIC). The processing unit 1004 executes a set of instructions to implement the operations of examples disclosed herein. The processing unit can include a processor core.

The additional memory devices 1006, 1008 and 1010 can store data, programs, instructions, database queries in text or compiled form, and any other information that can be needed to operate a computer. The memories 1006, 1008 and 1010 can be implemented as computer-readable media (integrated or removable) such as a memory card, disk drive, compact disk (CD), or server accessible over a network. In certain examples, the memories 1006, 1008 and 1010 can comprise text, images, video, and/or audio.

Additionally, the memory devices 1008 and 1010 can serve as databases or data storage. Additionally or alternatively, the system 1000 can access an external system (e.g., a web service) through the communication interface 1012, which can communicate with the system bus 1002 and the communication link 1014.

In operation, the system 1000 can be used to implement, for example, a client computer, a printer server, and at least some components of printers the can be employed in a system that manages a print job. Computer executable logic for implementing the system 1000 can reside in the system memory 1006, and/or in the memory devices 1008 and/or 1010 in accordance with certain examples. The processing unit 1004 executes computer executable instructions originating from the system memory 1006 and the memory devices 1008 and 1010. The term "computer readable medium" as used herein refers to a medium that participates in providing instructions to the processing unit 1004 for execution.

Where the disclosure or claims recite "a," "an," "a first," or "another" element, or the equivalent thereof, it should be interpreted to include one or more than one such element, neither requiring nor excluding two or more such elements. Furthermore, what have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

What is claimed is:

1. A peripheral subsystem, comprising:
    a replaceable or upgradable supply item to provide a resource to a peripheral device, wherein an encoded message identifier is installed with the supply item and comprises a trigger for a message event; and
    a supply message decoder to:
        receive the message event in response to a trigger condition being met based on the trigger of the encoded message identifier; and
        decode the message event; and
        identify a message that is stored on a network device corresponding to the decoded message event.

2. The peripheral subsystem of claim 1, wherein the message event is broadcast to peripheral devices that accept the supply item or transmitted to selected peripheral models within a peripheral platform.

3. The peripheral subsystem of claim 1, wherein the encoded message identifier includes a reference to a system or message to be displayed.

4. The peripheral subsystem of claim 1, wherein the encoded message identifier includes supply data that triggers the message event, wherein the message event is employed to communicate a message from a peripheral manufacturer, to determine a model number of a targeted peripheral, or determine that a message is to be broadcast to members of a designated peripheral class.

5. The peripheral subsystem of claim 1, wherein the encoded message identifier includes a data value that triggers classes of messages.

6. The peripheral subsystem of claim 5, wherein the classes of messages are related to no messages, warranty issues, recall issues, repairs, limited supplies availability, or new supply model numbers.

7. The peripheral subsystem of claim 1, wherein the message event triggers communications at a network website, wherein the communications include text, images, audio, graphics, or video.

8. The peripheral subsystem of claim 1, wherein the message event triggers communications at a local display associated with a peripheral, wherein the communications include text, images, audio, graphics, or video.

9. The peripheral subsystem of claim 1, wherein the supply item includes ink, toner, a replacement component, a repair component, or a device upgrade component.

10. The peripheral subsystem of claim 9, wherein the supply item is employed with a printer, a copier, a fax machine, a scanner, a peripheral device, or an entertainment device.

11. A method for peripheral communications, comprising:
receiving a message event triggered from a replacement device or upgrade device, wherein the message event comprises an encoded message identifier stored at the replacement device or upgrade device;
initiating remote network communications to determine at least one message based on the encoded message identifier; and
enabling display of the at least one message based in part on the message event.

12. The method of claim 11, further comprising enabling display of the at least one message at a network website or at a location local to a peripheral.

13. The method of claim 11, further comprising storing the encoded message identifier associated with a printer, a copier, a fax machine, a scanner, a peripheral device, or an entertainment device.

14. The method of claim 11, further comprising generating the at least one message to communicate recall information, warranty information, repair information, supply availability information, or a product name change related to alternative supplies that are available.

15. The method of claim 11, wherein message event comprises a bit triggered message identifier encoded as an integer in a map.

16. The method of claim 11, wherein the at least one message is generated at a manufacturer external to the peripheral.

17. The method of claim 11, further comprising:
transmitting a broadcast message to a peripheral that includes the encoded message identifier.

18. A computer peripheral comprising:
a first replaceable or upgradable supply item to provide a first resource to the computer peripheral;
a second replaceable or upgradable supply item to provide a second resource to the computer peripheral;
a memory to store computer executable instructions; and
a processor to access the memory and execute the computer executable instructions, the computer executable instructions comprising a supply message decoder to:
process message events triggered by the first and second encoded message identifiers stored at the respective first and second supply items to decode message identifiers within the message events; and
forward the message identifiers to a network site, wherein the network site employs the message identifiers to identify at least two different messages stored at the network site corresponding to the message identifiers for the computer peripheral.

19. The computer peripheral of claim 18, wherein the network site employs the first encoded message identifier to identify at least two different messages.

20. The computer peripheral of claim 18, wherein a message stored at the network site that corresponds to one of the first and second encoded message identifiers is a given message at a given time and another message at another time.

* * * * *